P. SABO.
AUTOMOBILE ELEVATING JACK.
APPLICATION FILED SEPT. 28, 1915.
1,172,839.
Patented Feb. 22, 1916.
2 SHEETS—SHEET 1.
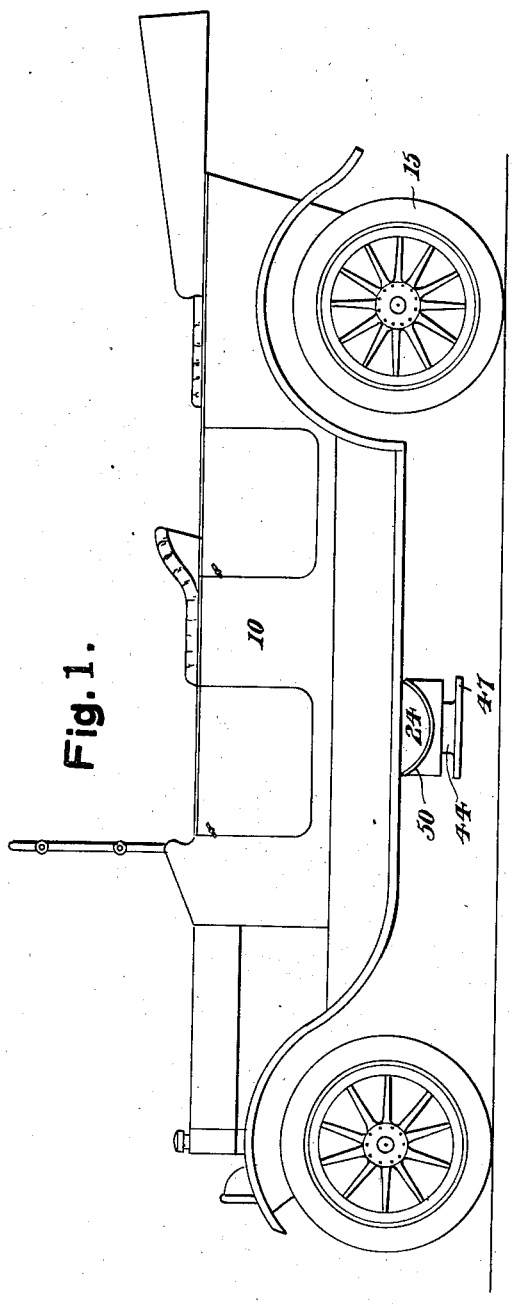
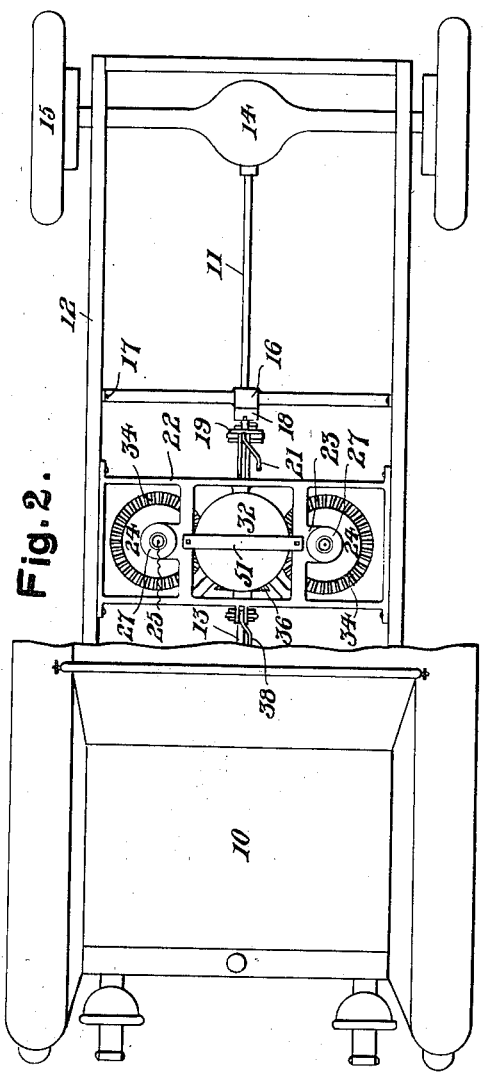
Inventor
P. Sabo
By A. M. Wilson
Attorney

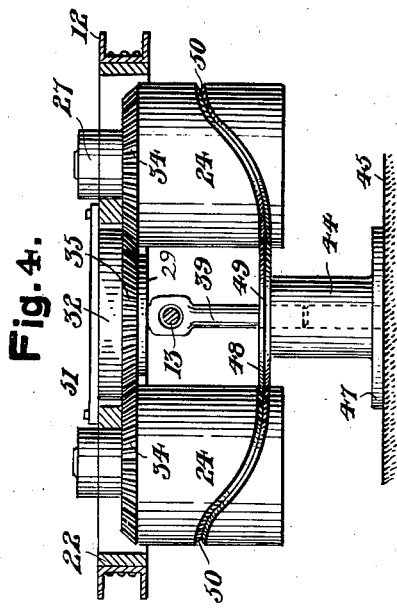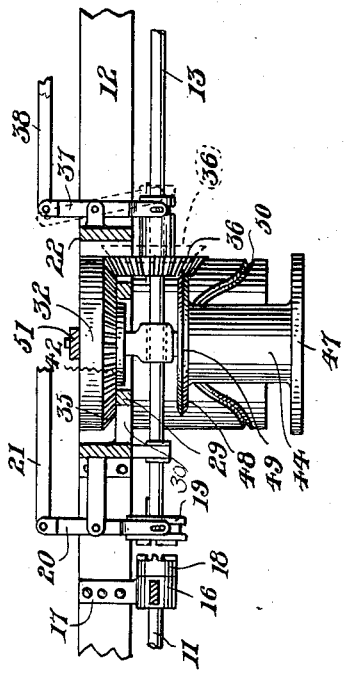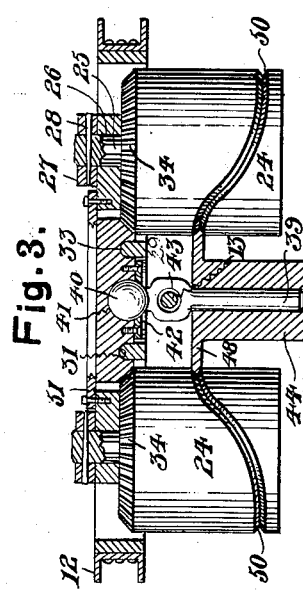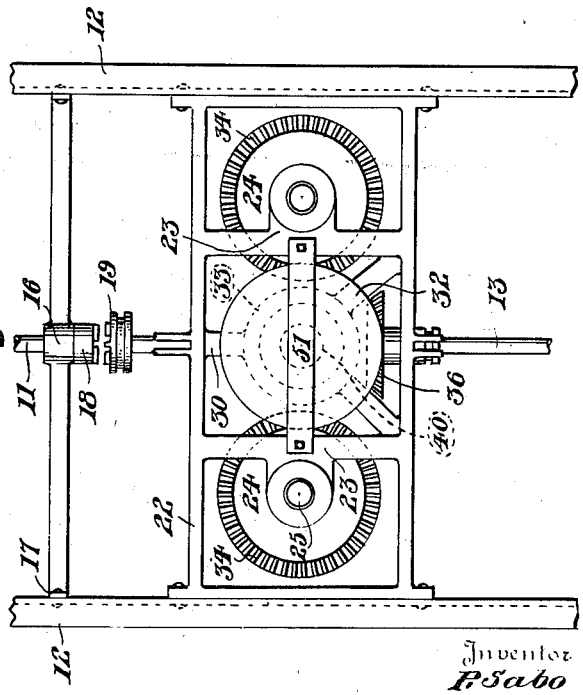

UNITED STATES PATENT OFFICE.

PAUL SABO, OF RACINE, WISCONSIN.

AUTOMOBILE-ELEVATING JACK.

1,172,839.

Specification of Letters Patent.     Patented Feb. 22, 1916.

Application filed September 28, 1915. Serial No. 53,031.

*To all whom it may concern:*

Be it known that I, PAUL SABO, a citizen of the United States, residing at Racine, in the county of Racine and State of Wisconsin, have invented certain new and useful Improvements in Automobile-Elevating Jacks, of which the following is a specification.

This invention relates to certain new and useful improvements in automobile elevating jacks.

The primary object of the invention is the provision of an elevating device carried beneath an automobile and adapted for operation by the engine thereof for raising the automobile above the ground.

A further object is to provide an elevating jack for a vehicle which is compact in form and exceedingly strong in structure and adapted for quickly raising the vehicle clear of the road bed by means of the usual motive power of the vehicle.

A still further object is to provide a vertically movable elevator positioned beneath a vehicle and adapted to be operatively clutched up with the operable motor of the vehicle at a time when the said motor is disconnected from the power wheels of the vehicle.

With these general objects in view and others that will appear as the nature of the invention is better understood, the same consists in the novel construction, combination and arrangement of parts hereinafter more fully described, illustrated in the accompanying drawings and then claimed.

In the drawings forming a part of this application and in which like designating characters refer to corresponding parts throughout the several views:—Figure 1 is a side elevation of an automobile provided with the present device. Fig. 2 is a top plan view thereof partially broken away. Fig. 3 is an enlarged vertical transverse sectional view through the device in its elevated inoperative position. Fig. 4 is a similar view with the device in its lowered supporting position. Fig. 5 is a longitudinal vertical detailed sectional view of the device, and, Fig. 6 is a top plan view thereof with the adjacent portion of the automobile.

Referring more in detail to the drawings, the automobile 10 is herein illustrated as provided with the present device and being constructed with the power shaft 11 extending substantially centrally and longitudinally of the automobile frame 12. The engine shaft 13 is also arranged in substantially the usual manner beneath the frame 12 and extends rearwardly to the gears (not shown) within the differential casing 14, the rear wheels 15 constituting the driving members of the automobile.

The power shaft 11 is journaled within a bearing 16 suspended by means of a bracket 17 from the automobile frame and is provided with a clutch member 18 upon the forward end thereof while a complementally formed clutch member 19 is splined upon the rear end of the engine shaft 13 and any convenient form of clutch throwing member such as the lever 20 is operatively attached to the clutch member 19 and is operable by a rod 21.

A supporting frame 22 is transversely carried by the frame 12 substantially centrally of the automobile and is provided with opposite beams 23 for revolubly supporting actuating blocks 24 which are of cylindrical form and are provided with centrally projecting axles 25 upon the tops thereof journaled through perforations 26 of the said beams 23, each of the said axles having a retaining washer 27 mounted thereon and secured thereto by a cross pin 28.

A centrally arranged journaling annulus 29 is connected by means of arms 30 to the frame 22. The upper edge 31 of the said annulus is curved and receives a beveled pinion 32 which is revolubly mounted thereon by means of an annular recess 33 in the lower side of the said pinion. The actuating blocks are provided upon their peripheries with gear teeth 34 which are in constant mesh with the teeth 35 upon the lower peripheral edge of the pinion 32. A beveled gear 36 is splined upon the engine shaft 13 and is adapted for adjustment into and out of meshing engagement with the pinion teeth 35 by means of an operating lever 37 controlled by a shiftable rod 38. A guide post 39 is arranged centrally depending from the pinion 32, having a spherical head 40 revolubly mounted in a corresponding socket 41 in the under face of the said pinion while a retaining plate 42 encircles the post 39 and is secured to the pinion 32 with the head 40 journaled therethrough. The engine shaft 13 freely extends through an opening 43 in the upper end of the post 39. A cross bar 51 is carried by the frame beams 23, overlying the pinion 32 for retaining said pinion in position.

A ground-engaging base or support 44 is provided for forcibly engaging the road bed such as 45 and is substantially spool-shaped having a central longitudinal bore 46 extending therethrough and in which the post 39 is slidably mounted. The lower flange 47 of the base affords additional supporting surface for the base while the upper flange 48 thereof is of slightly less diameter and is provided with a sharpened peripheral edge 49 positioned in constant engagement with the actuating blocks 24 by being seated within oppositely-arranged peripheral guide grooves or ways 50 of the actuating blocks, the said grooves extending circumferentially therearound and at opposite inclinations slightly curved upon the separate actuating blocks 24.

From this detailed description of the device, it will be seen that with the elements positioned as illustrated in Figs. 3 and 5 of the drawings, the operation of the clutch lever 37 may be employed for engaging the gear 36 in mesh with the horizontal pinion 32 and whereupon the actuating blocks 24 will each be revolved which will force the base 44 downwardly upon the guide post 39 by reason of the sliding engagement of the upper flange edge 49 with the block grooves 50. The base 44 will thus be contacted with the ground or road bed 45 while a continued pressure upon the base 44 will elevate the automobile upon the said base, the automobile being then suspended upon the said upper flange 48 by means of the blocks 24. It is obvious that by reversing the direction of rotation of the engine shaft 13, the blocks 24 will be reversely revolved for lowering the automobile to again assume its normal position upon the road bed 45. It will be understood that the clutch 19 of the power shaft 11 is out of mesh during this operation of the elevating jack, while of course, the gear 36 is disengaged from the pinion 32 when the jack is not in use and at which times the power shaft 11 may be clutched up with the engine shaft by means of the clutch members 18 and 19.

It will be apparent that an extremely strong elevating jack is thus provided for use upon automobiles and which by means of the motor of the vehicle will elevate the entire automobile with all of its wheels clear of the roadway and it would then be possible to slightly change the position of the automobile by turning the same upon the base 14 after the manner of a turn table.

While the form of the invention herein shown and described is believed to be the preferred embodiment thereof, it is nevertheless to be understood that various forms, modifications and arrangements of the parts may be made without departing from the spirit and scope of the invention as claimed.

What I claim as new is:—

1. In combination with an automobile, a supporting frame substantially centrally arranged therein, cylindrical actuating blocks vertically journaled in the said frame and having oppositely inclined guide grooves arranged encirclingly therearound, operating means for the said blocks, and a spool-shaped base support guidably mounted in operative engagement with the said grooves.

2. In combination with an automobile, a supporting frame substantially centrally arranged therein, cylindrical actuating blocks vertically journaled in the said frame and having oppositely inclined guide grooves arranged encirclingly therearound, operating means for the said blocks, and a guide post centrally carried by the said bracket and slidingly positioned through the central bore of the said spool-shaped support, the peripheral edge of the upper flange of the said support being complementally formed with respect to the said guide grooves and being in operative engagement therewith.

3. A vehicle jack comprising the combination with the vehicle frame and the engine shaft thereof, of a transverse supporting frame carried by the said vehicle frame having a centrally-arranged annulus having a curved upper edge, a pinion horizontally positioned and having an annular socket seated upon the said curved annular edge, oppositely-arranged actuating blocks cylindrical in form having toothed upper peripheries in mesh with the said pinion and vertically journaled in the said supporting frame, operative connections between the said engine shaft and pinion, and a base support between the said actuating blocks operatively connected thereto and adapted for vertical movement simultaneously with the revolving of the said blocks.

4. A vehicle jack comprising the combination with the vehicle frame and the engine shaft thereof, of a transverse supporting frame carried by the said vehicle frame having a centrally-arranged annulus having a curved upper edge, a pinion horizontally positioned and having an annular socket seated upon the said curved annular edge, oppositely-arranged actuating blocks cylindrical in form having toothed upper peripheries in mesh with the said pinion and vertically journaled in said supporting frame, operative connections between the said engine shaft and pinion, the said pinion having a central socket on the under face thereof and the said base support having a central longitudinal bore therethrough and having its upper flange provided with a sharpened periphery, the said blocks being provided with encircling oppositely-inclined guide grooves with the said flange periphery normally positioned therein, and a guide post slidably mounted within the said support bore and having a spherical head journaled within the said pinion socket.

5. An elevating jack for vehicles comprising a supporting frame, oppositely-arranged cylindrical actuating blocks vertically journaled therein and provided with encircling oppositely inclined guide grooves, an operating pinion for the said blocks horizontally journaled therebetween, a guide post rotatably suspended centrally of the said pinion, and a spool-shaped base support provided with a central bore within which the said post is slidably positioned and having its upper flange provided with a sharpened peripheral edge operatively engaging within the said guide grooves of the blocks.

6. An elevating jack for automobiles comprising a frame, actuating cylindrical blocks vertically journaled therein and having oppositely inclined encircling guide grooves, a base support in operative engagement with the said grooves and positioned between the said blocks, an operating pinion for the said blocks, and a guide post freely suspended from the said pinion and arranged in sliding contact with the said base support.

In testimony whereof I affix my signature.

PAUL SABO.

Witnesses:
CHRISTIAN JOHNSON,
PAUL A. POPULORUM.